(12) United States Patent
Wang et al.

(10) Patent No.: US 12,199,804 B2
(45) Date of Patent: Jan. 14, 2025

(54) COMMUNICATION METHOD, APPARATUS, AND DEVICE

(71) Applicant: HUAWEI TECHNOLOGIES CO., LTD., Guangdong (CN)

(72) Inventors: Xiaolu Wang, Hangzhou (CN); Rong Li, Hangzhou (CN); Hejia Luo, Hangzhou (CN); Bin Wang, Hangzhou (CN); Jun Wang, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 441 days.

(21) Appl. No.: 17/704,444

(22) Filed: Mar. 25, 2022

(65) Prior Publication Data

US 2022/0217029 A1 Jul. 7, 2022

Related U.S. Application Data

(63) Continuation of application No. PCT/CN2020/113628, filed on Sep. 4, 2020.

(30) Foreign Application Priority Data

Sep. 27, 2019 (CN) .......................... 201910923989.6

(51) Int. Cl.
*H04L 27/26* (2006.01)
*H04L 5/00* (2006.01)
*H04W 4/06* (2009.01)

(52) U.S. Cl.
CPC ........ *H04L 27/2607* (2013.01); *H04L 5/0007* (2013.01); *H04W 4/06* (2013.01)

(58) Field of Classification Search
CPC .............. H04L 27/2607; H04L 5/0007; H04L 27/2621; H04L 27/34; H04L 27/2678; H04L 27/3405; H04W 4/06
See application file for complete search history.

(56) References Cited

U.S. PATENT DOCUMENTS 10,348,967 B2 7/2019 Manabe
2006/0013325 A1 1/2006 Agrawal et al.
(Continued)

FOREIGN PATENT DOCUMENTS

CN 102238122 A 11/2011
CN 102377713 A 3/2012
(Continued)

OTHER PUBLICATIONS

Huawei et al., "Co-existence of Normal CP OFDM symbol and Extended CP OFDM symbol in D2D communication/discovery," 3GPP TSG RAN WG1 Meeting #76b, R1-141591, Shenzhen, China, Mar. 31-Apr. 4, 2014, 5 pages.
(Continued)

*Primary Examiner* — Vinncelas Louis
(74) *Attorney, Agent, or Firm* — Fish & Richardson P.C.

(57) ABSTRACT

Example communication methods and apparatus are described. One example method includes generating a first signal and sending a first signal, where the first signal includes an orthogonal frequency division multiplexing (OFDM) symbol, a first-type cyclic prefix (CP), and a second-type CP. CP resources of the first-type CP include two types of CP resources: a first CP resource and a second CP resource. CP resources of the second-type CP include one type of CP resource, that is, the second CP resource. The first CP resource may be used to carry data that is different from data carried on the OFDM symbol. The second CP resource may be used to carry data that is the same as the data carried on the OFDM symbol.

20 Claims, 10 Drawing Sheets

(56) References Cited

U.S. PATENT DOCUMENTS

| | | | |
|---|---|---|---|
| 2013/0215852 A1 | 8/2013 | Noh et al. | |
| 2013/0294317 A1* | 11/2013 | Malladi | H04W 4/06 370/312 |
| 2017/0026154 A1* | 1/2017 | Ratnakar | H04L 27/2607 |
| 2017/0149591 A1 | 5/2017 | Manolakos et al. | |

FOREIGN PATENT DOCUMENTS

| | | |
|---|---|---|
| CN | 105323048 A | 2/2016 |
| CN | 107682295 A | 2/2018 |
| CN | 109155773 A | 1/2019 |
| CN | 109156019 A | 1/2019 |
| CN | 109245857 A | 1/2019 |
| CN | 107852393 B | 11/2019 |
| EP | 1068704 B1 | 6/2012 |
| KR | 20100123078 A | 11/2010 |
| WO | 2016057195 A1 | 4/2016 |
| WO | 2017219986 A1 | 12/2017 |
| WO | 2019145855 A1 | 8/2019 |

OTHER PUBLICATIONS

Office Action issued in Chinese Application No. 201910923989.2 on Aug. 30, 2021, 8 pages (with English translation).

PCT International Search Report and Written Opinion issued in International Application No. PCT/CN2020/113628 on Nov. 26, 2020, 13 pages (with English translation).

Sharp, "Different CP length and different subcarrier spacing of in-band operation," 3GPP TSG RAN WG1 Meeting #83, R1-157118, Anaheim, USA, Nov. 15-22, 2015, 5 pages.

Hai-chuan et al., "Study on Parameter Estimation for the Short Length Cyclic Prefix OFDM Signal," Journal of Signal Processing, vol. 32, No. 12, Dec. 2016, 8 pages (with English abstract).

ZTE, "Consideration of cyclic prefix for NR," 3GPP TSG RAN WG1 Meeting #86, R1-166406, Gothenburg, Sweden, Aug. 22-26, 2016, 5 pages.

Extended European Search Report in European Appln No. 20867442.4, dated Nov. 22, 2022, 8 pages.

* cited by examiner

CP: Cyclic prefix
OFDM: Orthogonal frequency division multiplexing

IDFT: inverse discrete Fourier transform
CP: Cyclic Prefix

COMMUNICATION METHOD, APPARATUS, AND DEVICE

CROSS-REFERENCE TO RELATED APPLICATIONS

This application is a continuation of International Patent Application No. PCT/CN2020/113628, filed on Sep. 4, 2020, which claims priority to Chinese Patent Application No. 201910923989.6, filed on Sep. 27, 2019. The disclosures of the aforementioned applications are hereby incorporated by reference in their entireties.

TECHNICAL FIELD

This application relates to the field of communication technologies, and in particular, to a communication method, apparatus, and device.

BACKGROUND

In a frame (radio frame) structure in fifth generation mobile communication (5G) new radio (NR), there is a cyclic prefix (CP) in front of each orthogonal frequency division multiplexing (OFDM) symbol, and a length of the CP is not less than a multipath delay spread (or a multipath delay) of a wireless communication channel. Generally, there are two types of CPs: a normal CP and an extended CP.

With development of wireless communication technologies, terrestrial communication technologies and protocols are to adapt to non-terrestrial network (NTN) communication scenarios, to construct an air-space-ground integrated communication system. Non-terrestrial communication includes high altitude platform communication and high-orbit, medium-orbit, or low-orbit satellite communication. Different from terrestrial wireless communication channels, wireless communication channels of NTN communication (satellite-terrestrial communication and high altitude platform-terrestrial communication) feature a small multipath quantity, a small multipath delay spread, and a large proportion of direct-path signals. This is because a large number of user equipment (UE) for NTN communication are distributed in a suburb or a suburban area, and there are few buildings such as high buildings near the UEs (that is, there are few obstacles during signal transmission). Therefore, when a UE sends or receives a signal, a quantity of times that the signal is reflected, scattered, and/or diffracted on the wireless communication channel is relatively small, and a multipath quantity on the wireless communication channel is relatively small.

If a length of the CP in an NR protocol is still used in NTN communication, the length of the CP is far greater than the multipath delay spread of the NTN communication channel, causing a waste and low utilization of CP resources, and reducing transmission efficiency of an NTN communication system.

SUMMARY

Embodiments of this application provide a communication method, apparatus, and device, to reduce a waste of CP resources and improve utilization of the CP resources, thereby improving transmission efficiency of an NTN communication system.

The following describes this application from different aspects. It should be understood that mutual reference may be made to the following implementations and beneficial effects of the different aspects.

According to a first aspect, an embodiment of this application provides a communication method. The method may be applied to a non-terrestrial network communication system, and the method may include: generating a first signal and sending the first signal. The first signal includes an OFDM symbol, a first-type CP, and a second-type CP. CP resources of the first-type CP may include a first CP resource and a second CP resource. CP resources of the second-type CP may include the second CP resource. The first CP resource is used to carry data that is different from data carried on the OFDM symbol (or the data carried on the first CP resource is not duplicate with the data carried on the OFDM symbol, indicating that the first CP resource carries valid data). The second CP resource is used to carry data that is the same as the data carried on the OFDM symbol (or the data carried on the second CP resource is duplicate with the data carried on the OFDM symbol, indicating that the second CP resource carries invalid data). The CP resources may be data bits of a CP in time domain.

The first signal in this embodiment of this application includes two types of CPs. One type of CP (the first-type CP) includes two types of CP resources (the first CP resource and the second CP resource), and the other type of CP (the second-type CP) includes one type of CP resource (that is, the second CP resource). The first CP resource in the first-type CP is used to carry/send the data (that is, the valid data) that is different from (or not duplicate with) the data carried on the OFDM symbol. The second CP resource is used to carry/send the data (that is, the invalid data) that is the same as (or duplicate with) the data carried on the OFDM symbol. In this way, the CP resources can be properly used, a waste of the CP resources can be reduced, and utilization of the CP resources can be improved, thereby improving transmission efficiency of the NTN communication system.

With reference to the first aspect, in a possible implementation, a length of the first-type CP is greater than a first length, a length of the second-type CP is less than the first length, and a sum of lengths of M first-type CPs and K—M second-type CPs that belong to a same slot, a same subframe, or a same frame in the first signal is a product of the first length and K (that is, a total length of CPs in a slot, a subframe, or a frame remains unchanged). In this embodiment of this application, a length of a CP is flexibly configured (or integrated), and the first CP resource of the first-type CP whose length is integrated is used to carry/send the data (that is, the valid data) that is different from (or not duplicate with) the data carried on the OFDM symbol, so that the utilization of the CP resources can be further improved, thereby improving the transmission efficiency of the NTN communication system. The first length may be a length (herein, a time length) of a CP used by 5G NR when the NTN communication system operates under a same condition (for example, in the case of a same subcarrier spacing).

With reference to the first aspect, in a possible implementation, the data carried on the first CP resource may include side information. The side information may be generated based on a phase rotation factor.

With reference to the first aspect, in a possible implementation, a resource size of the first CP resource may be determined based on a size of data of the side information. Optionally, the resource size of the first CP resource may be greater than or equal to the size of the data of the side information. In this embodiment of this application, the resource size of the first CP resource is determined based on a size of data to be carried on the first CP resource. The size of the first CP resource may be allocated as required, to meet requirements of different services. In addition, flexibility of CP resource allocation can be improved.

With reference to the first aspect, in a possible implementation, the length of the second-type CP is greater than or equal to a multipath delay spread of a channel. In this embodiment of this application, the length of the second-type CP is controlled to be not less than the multipath delay spread of the channel, and the data that is the same as/duplicate with the data carried on the OFDM symbol is sent on the second CP resource of the second-type CP, so that inter-symbol interference (ISI) caused by a multipath phenomenon can be suppressed, and ICI can also be reduced.

With reference to the first aspect, in a possible implementation, the first CP resource may further include a first resource and a second resource. The first resource may be used to carry data that is the same as (or duplicate with) the side information, and the second resource may be used to carry the side information. In this embodiment of this application, some resources (the second resource) in the first CP resource are used to send the side information (where the side information is valid data), and the other resources (the first resource) are used to send data that is the same as (duplicate with) the side information (which is equivalent to describing that the side information also has a CP), to suppress the interference caused by the multipath phenomenon, thereby reducing a bit error rate at a receive end and improving system performance.

With reference to the first aspect, in a possible implementation, the method further includes: sending a CP indication message, where the CP indication message is used to indicate the first CP resource. In this embodiment of this application, the CP indication message is sent to notify the receive end in real time of CP resources that are used to send valid data, so that the receive end recovers the data carried on the first signal.

According to a second aspect, an embodiment of this application provides a communication apparatus. The communication apparatus includes units and/or modules configured to perform the communication method provided in any one of the first aspect and/or the possible implementations of the first aspect. Therefore, beneficial effects (or advantages) of the communication method provided in the first aspect can also be achieved.

According to a third aspect, an embodiment of this application provides a communication device, including a processor, a transceiver, and a memory. The memory is configured to store a computer program, the computer program includes program instructions, and when the processor runs the program instructions, the communication device is enabled to perform the communication method in the first aspect.

According to a fourth aspect, an embodiment of this application provides a computer-readable storage medium. The computer-readable storage medium stores computer program instructions, and when the computer program instructions are run on a computer, the computer is enabled to perform the communication method in the first aspect.

According to a fifth aspect, an embodiment of this application provides a computer program product. The computer program product includes computer program code, and when the computer program code is run on a computer, the computer is enabled to perform the communication method in the first aspect.

According to a sixth aspect, an embodiment of this application provides a chip, including a processor. The processor is configured to read and execute a computer program stored in a memory, to perform the method according to any one of the possible implementations of the first aspect. Optionally, the chip further includes the memory, and the memory is connected to the processor by using a circuit or a wire. Further, optionally, the chip further includes a communication interface, and the processor is connected to the communication interface. The communication interface is configured to receive data and/or a signal that need/needs to be processed. The processor obtains the data and/or the signal from the communication interface, processes the data and/or the signal, and outputs a processing result through the communication interface. The communication interface may be an input/output interface.

Optionally, the processor and the memory may be physically independent units, or the memory may be integrated with the processor.

According to the embodiments of this application, the waste of the CP resources can be reduced, and the utilization of the CP resources can be improved, thereby improving the transmission efficiency of the NTN communication system.

DESCRIPTION OF EMBODIMENTS

The following clearly describes technical solutions in embodiments of this application with reference to the accompanying drawings in the embodiments of this application.

A communication method provided in the embodiments of this application may be applied to a NTN communication system. The NTN communication system may include high altitude platform communication and high-orbit, medium-orbit, or low-orbit satellite communication. For ease of understanding, a system architecture of the NTN communication system is first briefly described in the embodiments of this application.

Figure 1A:
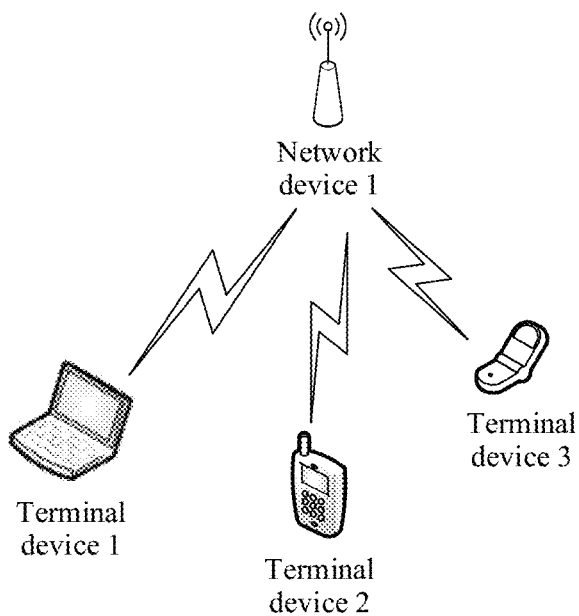
FIG. 1a and FIG. 1b are a system architectural diagram of an NTN communication system according to an embodiment of this application.
Figure 1B:
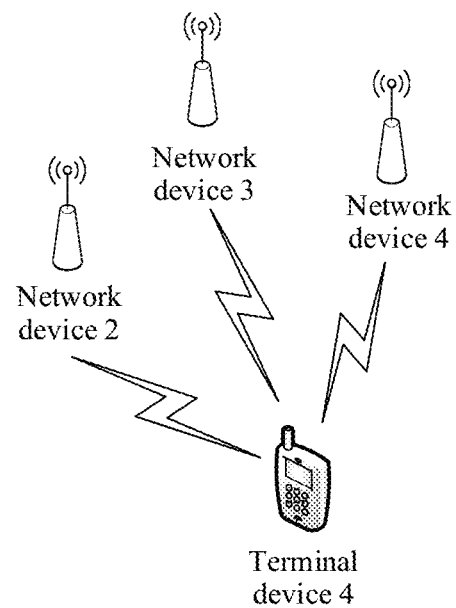

In some feasible implementations, the NTN communication system may include at least one network device and at least one terminal device (or UE). FIG. 1a and FIG. 1b are a system architectural diagram of the NTN communication system according to an embodiment of this application. As shown in FIG. 1a, one network device in the NTN communication system may communicate with one or more terminal devices. For example, a network device 1 separately sends data and/or control signaling to a terminal device 1, a terminal device 2, and a terminal device 3. As shown in FIG. 1b, a plurality of network devices in the NTN communication system may communicate with one or more terminal devices. For example, a network device 2, a network device 3, and a network device 4 simultaneously send data and/or control signaling to a terminal device 4. The network device (the network devices 1, 2, 3, and/or 4) in FIG. 1a and FIG. 1b includes, but is not limited to a high altitude platform station (HAPS) base station, a communication satellite, (such as a low-orbit, medium-orbit or high-orbit satellite), or the like. The terminal device (the terminal devices 1, 2, 3, and/or 4) in FIG. 1a and FIG. 1b includes but is not limited to a mobile terminal (such as a mobile phone, a computer, or a vehicle-mounted terminal), a fixed terminal (a ground transceiver), a gateway station, an air mobile station, a maritime mobile station, a land mobile station, a local station, a central station, or the like.

In some feasible implementations, if the NTN communication system is a high altitude platform communication system, the network device in FIG. 1a and FIG. 1b is a HAPS base station, and the terminal device may include a mobile terminal, a fixed terminal, a gateway station, or the like. The HAPS base station may exchange data with the mobile terminal, the fixed terminal, and/or the gateway station, and the HAPS base station may further send control signaling to the mobile terminal, the fixed terminal, and/or the gateway station. If the NTN communication system is a high-orbit, medium-orbit, or low-orbit satellite communication system, the network device in FIG. 1a and FIG. 1b is a communication satellite, and the terminal device may include an air mobile station, a maritime mobile station, a land mobile station, a local station, a central station, or the like. The communication satellite may exchange data with the air mobile station, the maritime mobile station, the land mobile station, the local station, and/or the central station, and the communication satellite may further send control signaling to the air mobile station, the maritime mobile station, the land mobile station, the local station, and/or the central station.

In some feasible implementations, when the network device sends data/a signal/a message/signaling to the terminal device, the network device may be referred to as a transmit end, and the terminal device may be referred to as a receive end. When the terminal device sends data/a signal/a message/signaling to the network device, the terminal device may be referred to as a transmit end, and the network device may be referred to as a receive end. The network device may be a base station NodeB, an evolved NodeB (eNB), a transmission reception point (TRP), or a next generation NodeB (gNB) in a 5G mobile communication system, a base station in a future mobile communication system, an access node in a Wi-Fi system, or the like. The terminal device may include a user terminal (UE), a mobile station (MS), a mobile terminal (MT), or the like. For ease of description, the following provides descriptions from a perspective of a transmit end and a receive end.

In some feasible implementations, when the transmit end communicates with the receive end, a signal sent by the transmit end may not only arrive at the receive end through a direct path, but also arrive at the receive end through a reflection, scattering, and/or diffraction path. This is a multipath phenomenon. Therefore, signals received by the receive end include not only the signal that arrives through the direct path but also each delay signal of the signal that arrives through the direct path. A difference between a time of arrival of the last distinguishable delay signal and a time of arrival of the first delay signal is a multipath delay spread, that is, a difference between a maximum transmission delay and a minimum transmission delay is a multipath delay spread.

For a 5G NR system, an OFDM symbol-based waveform is used at the transmit end, and a CP is added in front of each OFDM-based symbol. Generally, a length of the CP is not less than a multipath delay spread of a channel. Due to addition of a CP in front of an OFDM symbol of a radio frame, transmission efficiency of the system is reduced. However, the CP can suppress inter-symbol interference (ISI) caused by the multipath phenomenon. In addition, the CP can also reduce inter-carrier interference (ICI).

For an NTN communication system, terminal devices (or UEs) in the NTN communication system on the ground are mostly distributed in a wide area, such as a suburb or a suburban area, and there are fewer buildings such as high buildings in the wide area (the suburb or the suburban area). It indicates that there are fewer obstacles during signal transmission on an NTN communication channel, that is, there are fewer paths for a signal to arrive at the receive end through reflection, scattering, and/or diffraction. It also indicates that a multipath quantity is small when the signal is sent on the NTN communication channel. Therefore, a multipath delay spread in the NTN communication system is small. In addition, if a CP in the 5G NR system is still used in the NTN communication system, a CP length of an OFDM symbol in 5G NR is excessively long relative to the multipath delay spread of the NTN communication channel, causing a waste and low utilization of CP resources and low transmission efficiency of the NTN communication system.

For the foregoing problems, such as the waste and the low utilization of the CP resources and the low transmission efficiency of the NTN communication system, the embodiments of this application provide a communication method, to flexibly configure a length of a CP (integrate CP lengths/CP resources), reduce a waste of the CP resources, and improve utilization of the CP resources, thereby improving the transmission efficiency of the NTN communication system. In addition, a length (10 ms) of a radio frame, a length (1 ms) of a subframe, a length of a slot, and a quantity of symbols (where the symbols refer to OFDM symbols) in each slot in 5G NR remain unchanged.

The following describes in detail the communication method provided in the embodiments of this application with reference to FIG. 2 to FIG. 9.

For ease of description, the communication method provided in the embodiments of this application is described below by using communication between one transmit end and one receive end as an example. The transmit end may be a network device or a terminal device (or UE), and correspondingly, the receive end may be the terminal device (or the UE) or the network device. Optionally, for communication between one transmit end and a plurality of receive ends and communication between a plurality of transmit ends and one or more receive ends, refer to communication between one transmit end and one receive end. Details are not described herein.

In some feasible implementations, an OFDM symbol in the embodiments of this application may generally refer to an inverse discrete Fourier transform (IDFT) based OFDM symbol or a symbol in another form obtained after additional processing and/or transform is performed on the IDFT based OFDM symbol, such as a discrete Fourier transform-spread-orthogonal frequency division multiplexing (DFT-S-OFDM) symbol, a filter bank multi-carrier (FBMC) symbol, or a filtered orthogonal frequency division multiplexing (f-OFDM) symbol. For ease of description, an IDFT based OFDM symbol (which is referred to as an OFDM symbol for short below) is used as an example for description in the embodiments of this application.

In some feasible implementations, CP resources mentioned in the embodiments of this application may be data bits of a CP in time domain or a time-frequency resource of the CP.

Figure 2:
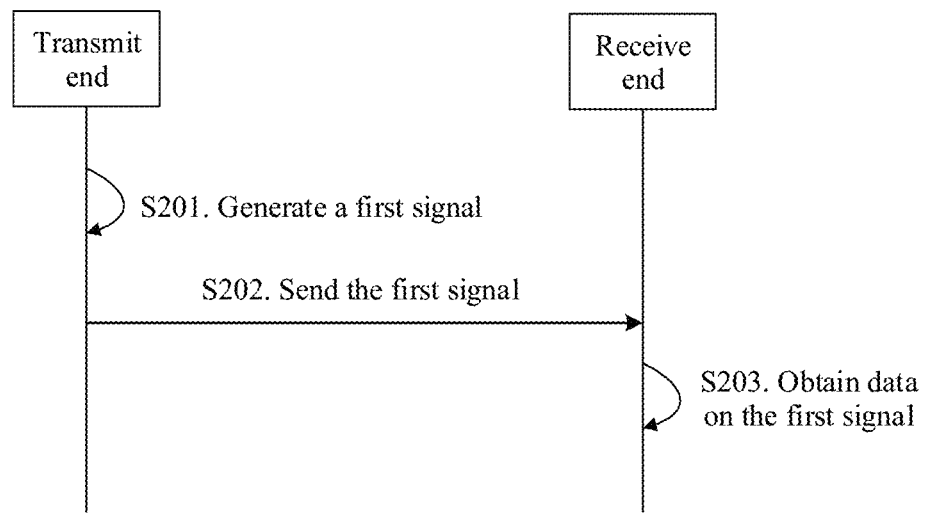
FIG. 2 is a schematic flowchart of a communication method according to an embodiment of this application.

FIG. 2 is a schematic flowchart of a communication method according to an embodiment of this application. As shown in FIG. 2, the communication method provided in this embodiment of this application may include the following steps.

S201. A transmit end generates a first signal.

In some feasible implementations, the first signal may be any signal sent by the transmit end, and the first signal may carry any type of data, such as user data or signaling data. The first signal may include an OFDM symbol, a first-type CP, and a second-type CP. There is a CP in front of each OFDM symbol. CP resources of the first-type CP may include two types of CP resources: a first CP resource and a second CP resource. CP resources of the second-type CP may include one type of CP resource, that is, the second CP resource. The first CP resource may be used to carry data that is different from data carried on the OFDM symbol (or the data carried on the first CP resource is not duplicate with the data carried on the OFDM symbol, indicating that the first CP resource carries valid data). The second CP resource may be used to carry data that is the same as the data carried on the OFDM symbol (or the data carried on the second CP resource is duplicate with the data carried on the OFDM symbol, indicating that the second CP resource carries invalid data). The CP resources may be data bits of the CP in time domain.

The first signal in this embodiment of this application includes two types of CPs. One type of CP (the first-type CP) includes two types of CP resources (the first CP resource and the second CP resource), and the other type of CP (the second-type CP) includes one type of CP resource (that is, the second CP resource). The first CP resource in the first-type CP is used to carry/send the data (that is, the valid data) that is different from (or not duplicate with) the data carried on the OFDM symbol. The second CP resource is used to carry/send the data (that is, the invalid data) that is the same as (or duplicate with) the data carried on the OFDM symbol. In this way, the CP resources can be properly used, a waste of the CP resources can be reduced, and utilization of the CP resources can be improved, thereby improving transmission efficiency of an NTN communication system.

Figure 3:
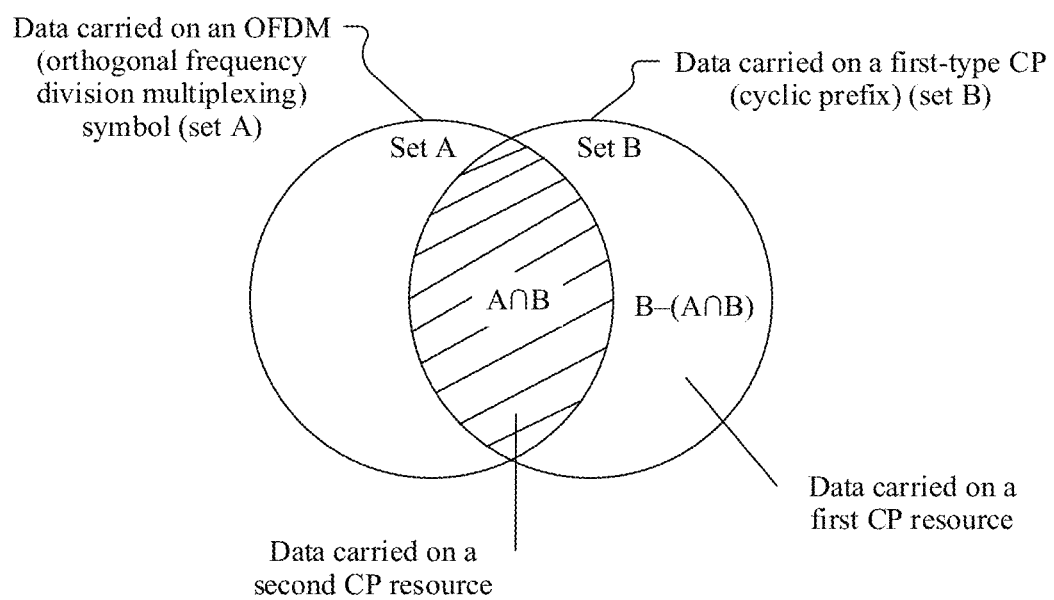
FIG. 3 is a schematic diagram of a relationship between an OFDM symbol and data carried on a first-type CP according to an embodiment of this application.
Figure 4:
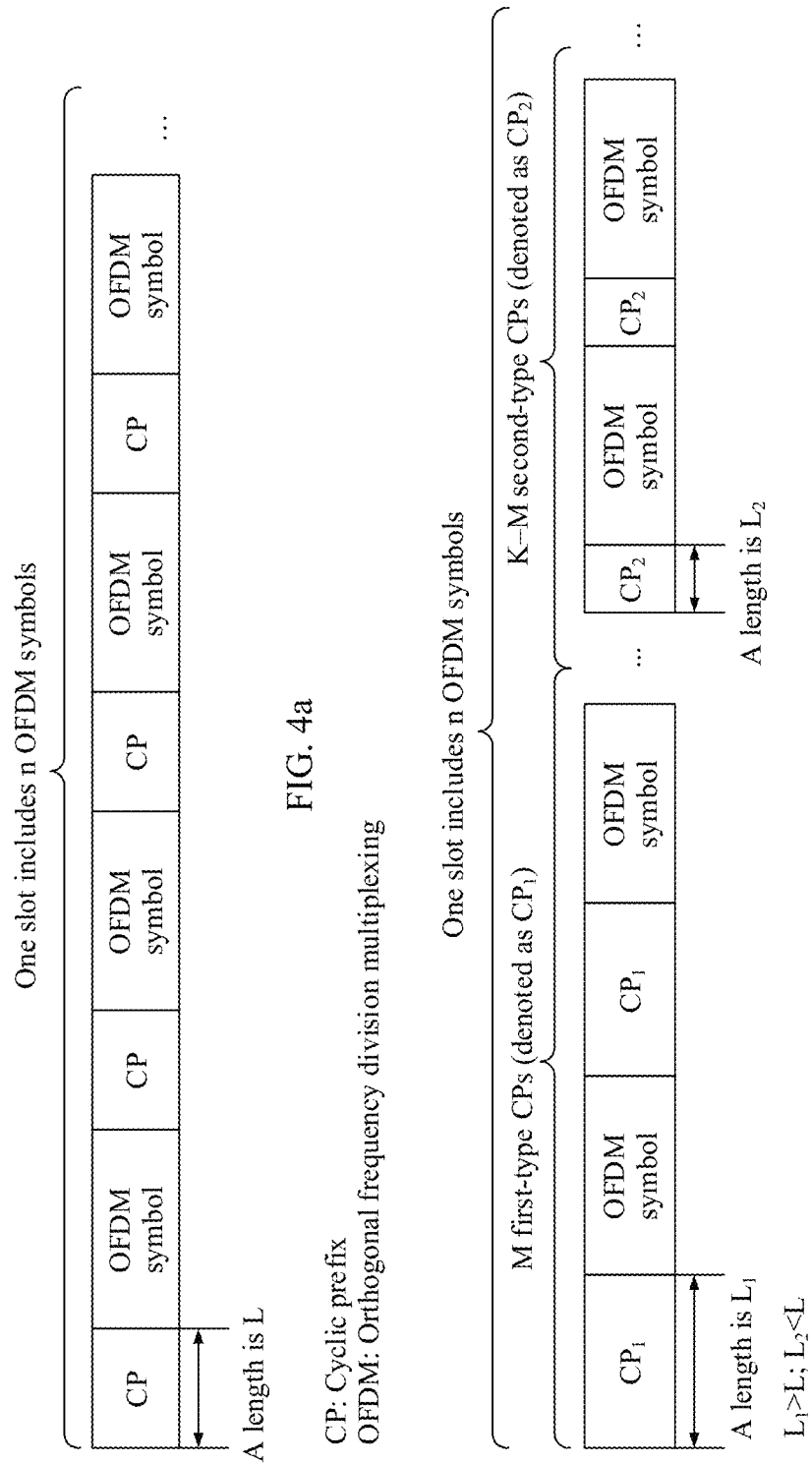
FIG. 4a and FIG. 4b are a schematic diagram of length comparison of CPs in a slot according to an embodiment of this application.

For example, one OFDM symbol is used as an example. FIG. 3 is a schematic diagram of a relationship between an OFDM symbol and data carried on a first-type CP according to an embodiment of this application. It is assumed that data carried on an OFDM symbol is represented by a set A, a CP in front of the OFDM symbol is a first-type CP, and data carried on the first-type CP is represented by a set B. As shown in FIG. 3, data carried on a first CP resource of the first-type CP is a part (that is, B—(A∩B)) in the set B other than an intersection set of the set A and the set B. Data carried on a second CP resource of the first-type CP is the intersection set (A∩B) of the set A and the set B.

In some feasible implementations, the first signal may include K OFDM symbols, each OFDM symbol carries data, there is a CP in front of each OFDM symbol, and the K OFDM symbols may belong to a same slot, a same subframe, or a same frame. The CP in front of each of the K OFDM symbols may be a first-type CP or a second-type CP. The first signal may further include M first-type CPs and K—M second-type CPs, and the M first-type CPs and the K—M second-type CPs may belong to a same slot, a same subframe, or a same frame. A length of each of the M first-type CPs may be greater than a first length, and a length of each of the K—M second-type CPs may be less than the first length. Optionally, lengths of all of the M first-type CPs may be the same or different. Likewise, lengths of all of the K—M second-type CPs may be the same or different. A sum of lengths of M first-type CPs and K—M second-type CPs that belong to a same slot, a same subframe, or a same frame in the first signal may be equal to a product of the first length and K (that is, a total length of CPs in a slot, a subframe, or a frame remains unchanged). Optionally, the first signal may include N OFDM symbols, and M OFDM symbols in the N OFDM symbols belong to a same slot, a same subframe, or a same frame. CPs in front of the remaining N—M OFDM symbols in the N OFDM symbols may be third-type CPs, that is, the first signal may further include a third-type CP. A length of the third-type CP may be equal to the first length, and CP resources of the third-type CP may include at least one type of CP resource, for example, the second CP resource. In this embodiment of this application, a length of a CP is flexibly configured (or integrated), and the first CP resource of the first-type CP whose length is integrated is used to carry/send data (that is, the valid data) that is different from (or not duplicate with) the data carried on the OFDM symbol. The data may be sent on the first CP resource of the first-type CP, so that the utilization of the CP resources can be further improved, thereby improving the transmission efficiency of the NTN communication system.

K may be a natural number greater than 1 and less than or equal to 14, M may be a natural number greater than or equal to 1, K may be greater than M, N may be a natural number greater than 1, and N may be greater than or equal to K. The length of the first-type CP or the second-type CP herein may be a time length of the CP. Correspondingly, the first length herein may be a time length of a CP used by 5G NR when the NTN communication system operates under a same condition (for example, in the case of a same subcarrier spacing).

For example, FIG. 4a and FIG. 4b are a schematic diagram of length comparison of CPs in a slot according to an embodiment of this application. As shown in FIG. 4a and FIG. 4b, it is assumed that one slot includes n OFDM symbols and n CPs, and there is a CP in front of each OFDM symbol. FIG. 4a shows n OFDM symbols in one slot and shows that lengths of CPs in front of the n OFDM symbols are equal to the first length L. FIG. 4b shows M first-type CPs and K—M second-type CPs in one slot. In FIG. 4b, it is assumed that a length of each first-type CP (denoted as $CP_1$) is $L_1$, and $L_1>L$; a length of each second-type CP (denoted as $CP_2$) is $L_2$, and $L_2<L$. Optionally, K is less than or equal to n. If K is less than n, one slot further includes n—K third-type CPs (not shown in FIG. 4b), and a length $L_3$ of the third-type CP=L.

In some feasible implementations, the first CP resource may include two parts of CP resources: a first resource and a second resource. Data carried on the first resource may be the same as/duplicate with data carried on the second resource, indicating that the first resource is used to suppress interference caused by a multipath phenomenon. Data carried on the second resource may be different from/not duplicate with the data carried on the OFDM symbol, indicating that the second resource is used to send valid data. Optionally, the data carried on the first CP resource may include side information, and the side information may be generated based on a phase rotation factor combination. The first resource in the first CP resource may be used to carry data that is the same as the side information (that is, the data carried on the first resource is duplicate with the side information, indicating that the side information may also have a CP). The second resource in the first CP resource may be used to carry the side information. In this embodiment of this application, when valid data is sent on the first CP resource of the first-type CP, some resources (the second resource) in the first CP resource are used to send the valid data, and the other resources (the first resource) are used to send data that is duplicate with the valid data (which is equivalent to describing that the valid data also has a CP), to suppress the interference caused by the multipath phenomenon, thereby reducing a bit error rate at a receive end and improving system performance.

Figure 5:
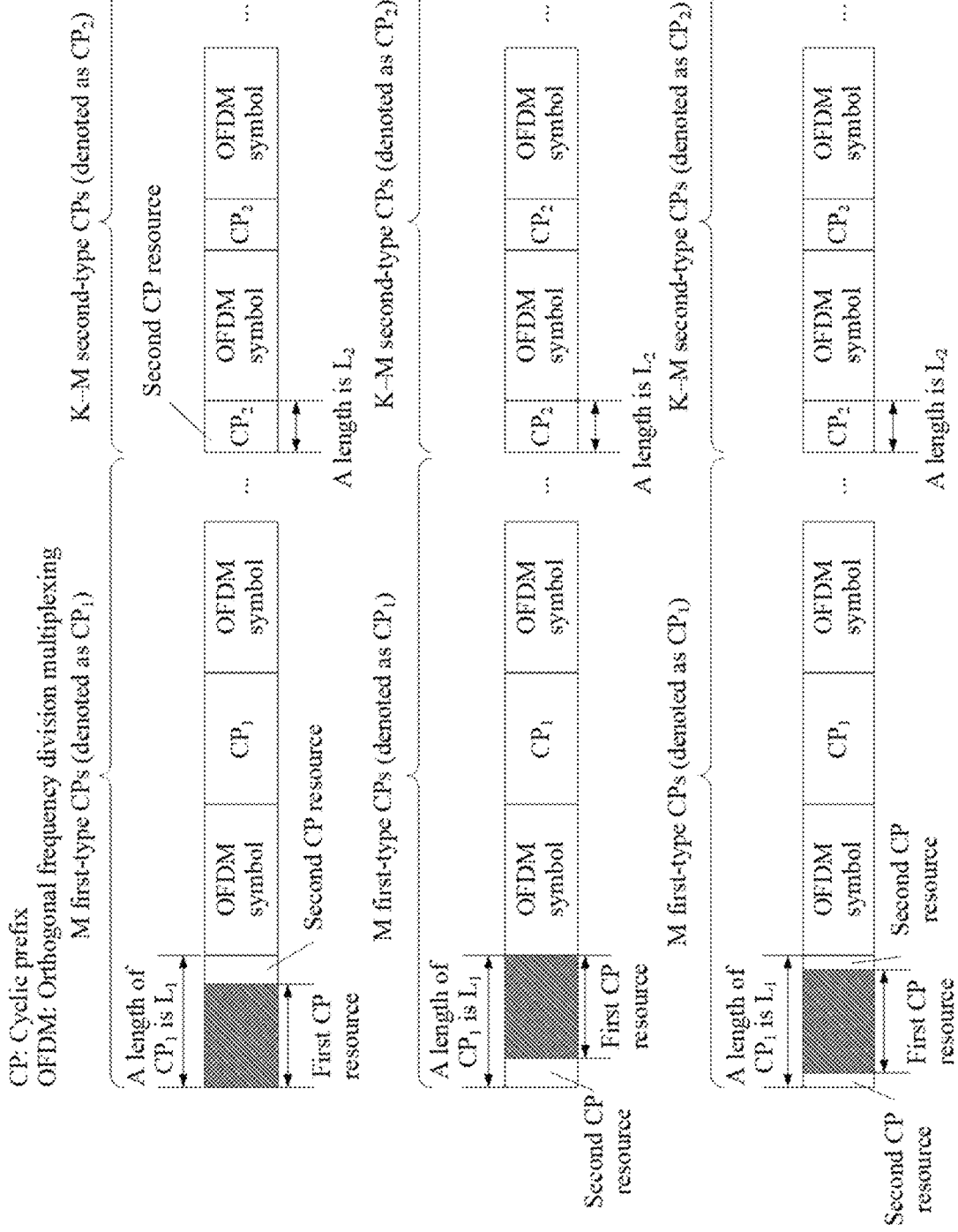
FIG. 5 is a schematic diagram of a position relationship between a first-type CP and a first CP resource according to an embodiment of this application.

Optionally, FIG. 5 is a schematic diagram of a position relationship between the first-type CP and the first CP resource according to an embodiment of this application. The first CP resource may be located in a front part of the first-type CP (denoted as $CP_1$), and correspondingly, the second CP resource is located in a back part of the first-type CP. Alternatively, the first CP resource may be located in a back part of the first-type CP, and correspondingly, the second CP resource is located in a front part of the first-type CP. Alternatively, the first CP resource may be located in the middle of the first-type CP, and correspondingly, second CP resources are located in a front part and a back part of the first-type CP. This is not limited in this embodiment of this application. The second CP resources may not be contiguous resources.

In some feasible implementations, a resource size of the first CP resource may be determined based on a size of data to be carried on the first CP resource. For example, it is preset in such a manner that the first CP resource is used to carry the side information. It is assumed that a size of data of side information (where the side information may be generated based on a phase rotation factor combination) generated by the transmit end when the transmit end generates a specific OFDM symbol is 20 data bits, and a CP in front of the OFDM symbol is a first-type CP. In this case, a resource size of the first CP resource included in the first-type CP in front of the OFDM symbol may be greater than or equal to 20 data bits. In this embodiment of this application, the resource size of the first CP resource is determined based on a size of data to be carried on the first CP resource. The size of the first CP resource may be allocated as required, to meet requirements of different services. In addition, flexibility of CP resource allocation can be improved.

Optionally, the length of the second-type CP may be greater than or equal to a multipath delay spread of a wireless communication channel in the NTN communication system. In this embodiment of this application, the length of the second-type CP is controlled to be not less than the multipath delay spread of the channel, so that ISI caused by the multipath phenomenon can be suppressed, and ICI can also be reduced.

In some feasible implementations, the transmit end may configure a length of a CP for K OFDM symbols in a same slot, a same subframe, or a same frame. It is assumed that before configuration, a length of the CP in front of each OFDM symbol is equal to the first length. The transmit end may reduce (shorten) lengths of CPs in front of any K—M OFDM symbols in the K OFDM symbols to obtain K—M second-type CPs, and increase (extend) lengths of CPs of the remaining M OFDM symbols in the K OFDM symbols to obtain M first-type CPs. Optionally, when reducing or increasing the lengths of the CPs, the transmit end may reduce or increase the lengths according to a proportion, or may reduce or increase the lengths by a same value. A configured length of each first-type CP is greater than the first length, a length of each second-type CP is less than the first length, and a total length of the M first-type CPs and the K—M second-type CPs is equal to the product of K and the first length. After configuring the lengths of the CPs for the OFDM symbols, the transmit end may not only include data to the OFDM symbols, but also send the valid data (where the valid data may be the data carried on the first CP resource) on one type of CP (that is, on the first-type CP) with an increased length. When sending the valid data on the first-type CP, the transmit end may use a single carrier, a multi-carrier, or another carrier form. This is not limited in this embodiment of this application.

Figure 6A:
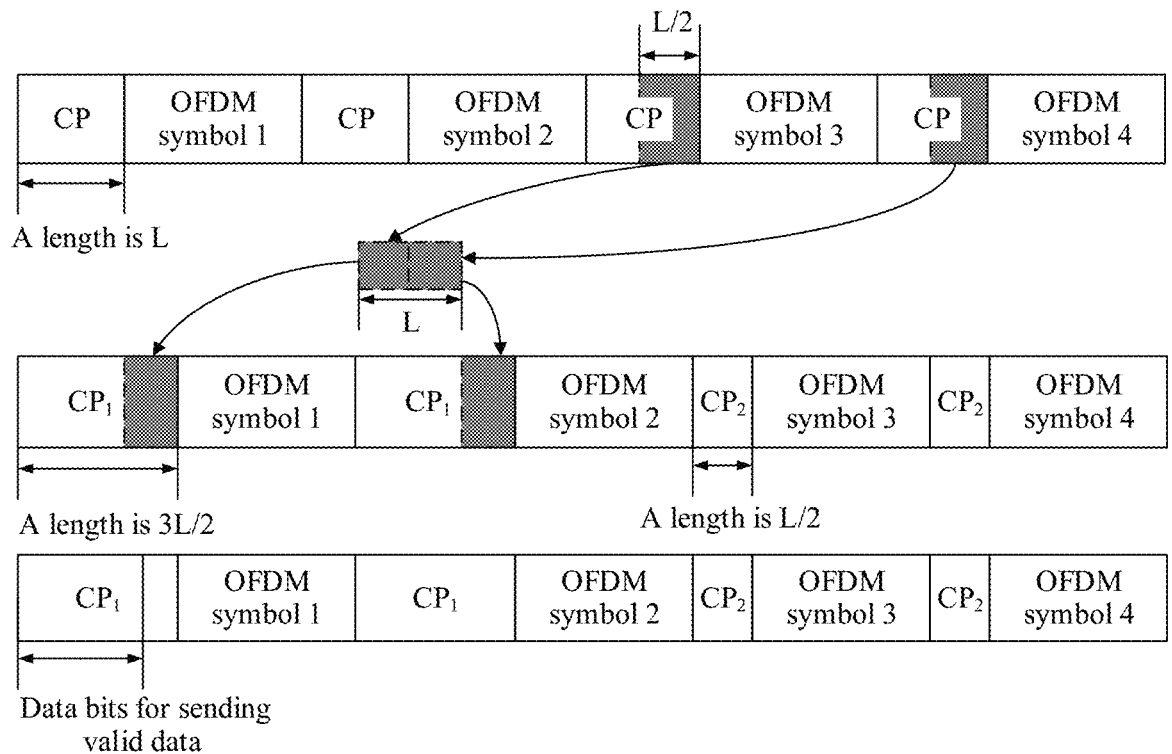
FIG. 6a and FIG. 6b are a schematic diagram of a length change of a CP according to an embodiment of this application.
Figure 6B:
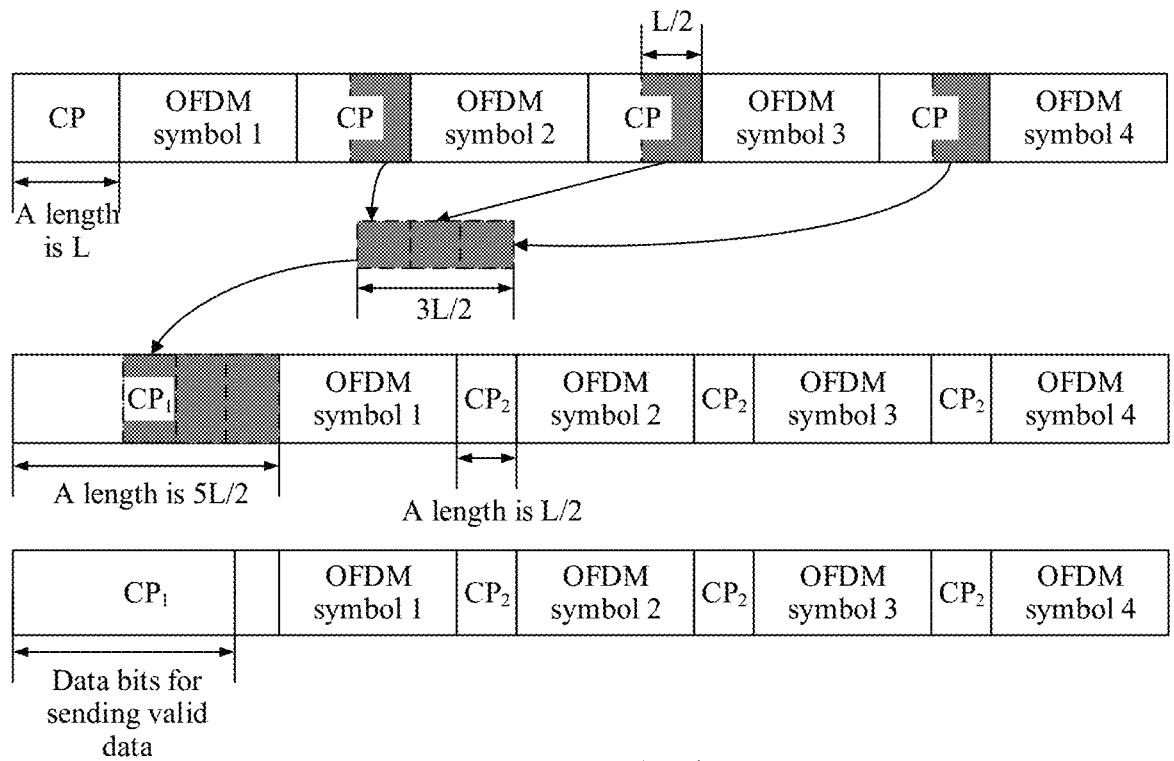

For example, FIG. 6a and FIG. 6b are a schematic diagram of a length change of a CP according to an embodiment of this application. In FIG. 6a and FIG. 6b, it is assumed that K=4. Four OFDM symbols are used as an example. The four OFDM symbols may be an OFDM symbol 1, an OFDM symbol 2, an OFDM symbol 3, and an OFDM symbol 4. A length of a CP in front of each OFDM symbol before configuration is the first length L. The transmit end may allocate some resources of CPs in front of K—M OFDM symbols in the K OFDM symbols (the OFDM symbols 1, 2, 3, and 4) to CPs in front of the remaining M OFDM symbols. As shown in FIG. 6a, M=2, and the transmit end may reduce the length of each CP in front of the OFDM symbols 3 and 4 by L/2, to obtain two second-type CPs (denoted as CP2), and evenly allocate a reduced total length (L/2+L/2=L) of the CPs in front of the OFDM symbols 3 and 4 to the CPs in front of the OFDM symbols 1 and 2, to obtain two first-type CPs (denoted as $CP_1$). In this case, the length of each CP in front of the OFDM symbols 1 and 2 is increased by L/2. The transmit end sends valid data (for example, side information) on the first-type CP. FIG. 6a merely shows an example in which the valid data is sent on the first-type CP in front of the OFDM symbol 1. During actual application, the valid data may alternatively be sent on the first-type CP in front of the OFDM symbol 2. As shown in FIG. 6b, M=3, and the transmit end may reduce the length of each CP in front of the OFDM symbols 2, 3, and 4 by L/2, to obtain three second-type CPs, and allocate a reduced total length (L/2+L/2+L/2=3L/2) of the CPs in front of the OFDM symbols 2, 3, and 4 to the CP in front of the OFDM symbol 1, to obtain one first-type CP. In this case, the length of the CP in front of the OFDM symbol 1 is increased by 3L/2. The transmit end sends valid data on the first-type CP.

S202. The transmit end sends the first signal to the receive end. Correspondingly, the receive end receives the first signal.

In some feasible implementations, before the transmit end sends the first signal to the receive end, the transmit end and the receive end may pre-agree, by using signaling or a protocol, on a CP resource (that is, the first CP resource of the first-type CP) used to send the valid data or the like, for example, pre-agree on slots or subframes or frames and CP data bits in front of specific OFDM symbols for sending the valid data, so that the receive end recovers the data carried on the first signal.

S203. The receive end obtains the data on the first signal.

In some feasible implementations, after receiving the first signal, the receive end may extract the data carried on the first CP resource of the OFDM symbol according to a pre-agreed first CP resource of the first-type CP that is used to send valid data. The receive end may remove CPs of all OFDM symbols in the first signal, and then extract the data carried on the OFDM symbol. The receive end may integrate data carried on all first CP resources in the first signal and data carried on all the OFDM symbols from which the CPs are removed into complete data (that is, recover the data included by the transmit end to the first signal).

In an optional implementation, the transmit end notifies the receive end in real time by using signaling or an indication message of first CP resources of the first-type CP that are used to send valid data by the transmit end, so that the receive end recovers the data carried on the first signal. Therefore, before step S203, the transmit end may further send a CP indication message to the receive end in real time. Correspondingly, the receive end receives the CP indication message. The CP indication message may be used to indicate the first CP resource of the first-type CP.

In this embodiment of this application, the transmit end generates the first signal and sends the first signal. The first signal includes the OFDM symbol, the first-type CP, and the second-type CP. The CP resources of the first-type CP include two types of CP resources: the first CP resource and the second CP resource. The CP resources of the second-type CP include one type of CP resource, that is, the second CP resource. The first CP resource may be used to carry the data that is different from the data carried on the OFDM symbol (that is, the data carried on the first CP resource and the data carried on the OFDM symbol are not duplicate, indicating that the first CP resource carries the valid data). The second CP resource may be used to carry the data that is the same as the data carried on the OFDM symbol (that is, the data carried on the second CP resource is duplicate with the data carried on the OFDM symbol, indicating that the second CP resource carries the invalid data). In this embodiment of this application, the valid data is sent on the first CP resource of the first-type CP, so that the utilization of the CP resources can be improved, and the waste of the CP resources can be reduced, thereby improving the transmission efficiency of the NTN communication system.

Figure 7:
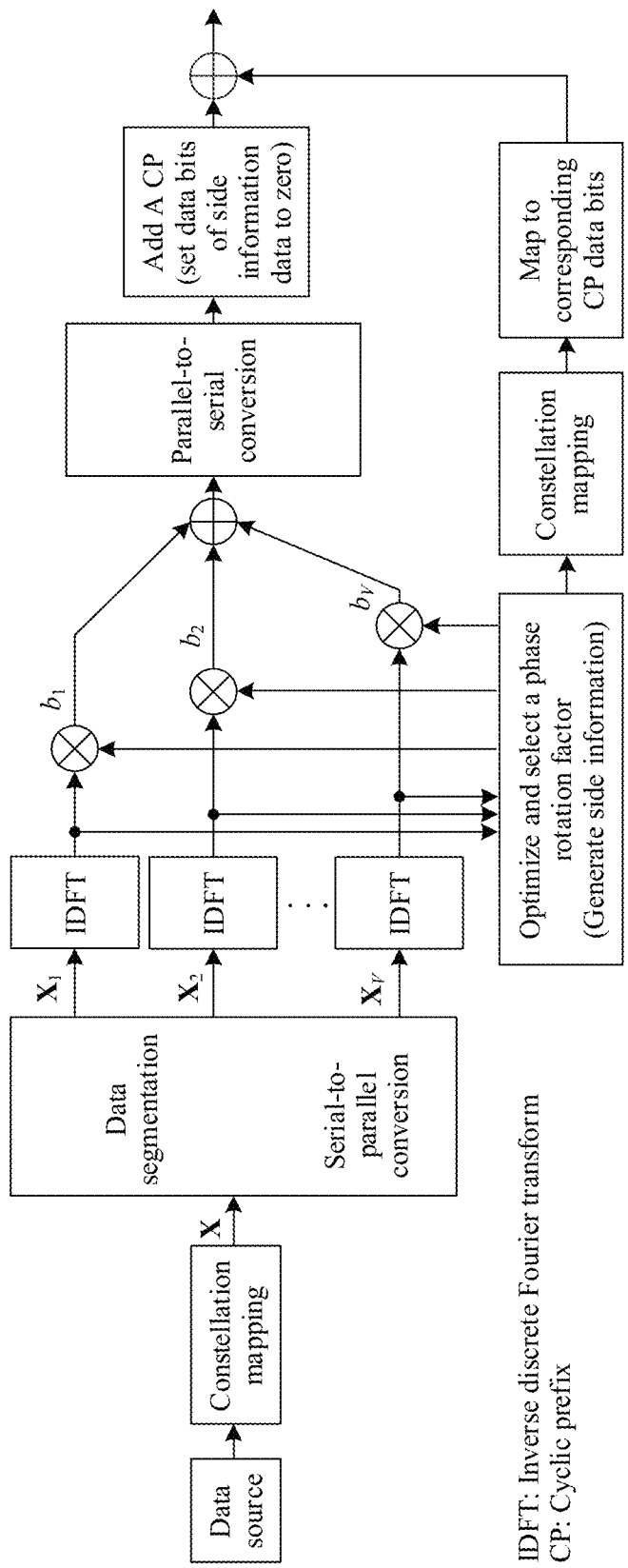
FIG. 7 is a schematic diagram of generating an OFDM symbol by a transmit end according to an embodiment of this application.

In an optional specific embodiment, FIG. 7 is a schematic diagram of generating an OFDM symbol by a transmit end according to an embodiment of this application. A process in which the transmit end generates the OFDM symbol is briefly described below with reference to FIG. 7.

Step 1: Perform constellation mapping (for example, 16 quadrature amplitude modulation (QAM) mapping or 64QAM mapping) on a data source (where the data source may refer to a data source after channel coding), to obtain a baseband constellation mapping signal $X=[x_0, x_1, \ldots, x_{P-1}]$. P is an integer greater than 1.

Step 2: Perform data segmentation on the baseband constellation mapping signal X, and divide (which may refer to evenly dividing herein) the baseband constellation mapping signal X into V (V>0) data sub-blocks, to obtain data sub-blocks $X_1, X_2, \ldots,$ and $X_V$. A length of each data sub-block is P, and there are P/V pieces of valid data in each data sub-block. For example, $X_1=[x_0, x_1, \ldots, x_{P/V-1}, 0, \ldots, 0, 0]$, $X_2[0, 0, \ldots, 0, x_{P/V}, x_{P/V+}, \ldots x_{2P/V-1}, 0, \ldots, 0, 0]$.

Step 3: Perform IDFT processing separately on the V data sub-blocks after serial-to-parallel conversion is performed on the V data sub-blocks.

Step 4: Optimize a peak to average power ratio (PAPR) of an OFDM symbol according to a preselected set of phase rotation factors, and select an optimal or suboptimal phase rotation factor combination $[b_1, b_2, \ldots, b_V]$. For example, the preselected set of phase rotation factors may be $\{+1, -1, +i, -i\}$.

The phase rotation factor may be understood from a perspective of a phase or a complex number. From the perspective of a phase, in the preselected set $\{1+1, -1, +i, -i\}$ of the phase rotation factors, +1 may represent phase rotation of 0°, −1 may represent phase rotation of 180°, +i may represent phase rotation of +90°, and −i may represent phase rotation −90° (or) 270°. From the perspective of a complex number, in the preselected set $\{+1, -1, +i, -i\}$ of the phase rotation factors, +1 and −1 may represent real parts, and +i and −i may represent imaginary parts. The phase rotation factor combination $[b_1, b_2, \ldots, b_v]=[+1, -1, +i, -i, +1, -1, +i, -i, \ldots]$.

Step 5: Perform channel coding and constellation mapping on the phase rotation factor combination to obtain a baseband constellation mapping signal (that is, side information).

Step 6: Multiply the data sub-block obtained in step 2 and the optimal or suboptimal phase rotation factor obtained in step 4, to obtain V new data sub-blocks, add up the data sub-blocks, and then perform parallel-to-serial conversion to obtain an OFDM symbol.

Step 7: Add a first-type CP to the OFDM symbol obtained in step 6, set all Q (Q>0) data bits (corresponding to the foregoing first CP resource) in the first-type CP to zero, and reserve the data bits to send side information (the baseband constellation mapping signal) obtained in step 5.

Figure 8:
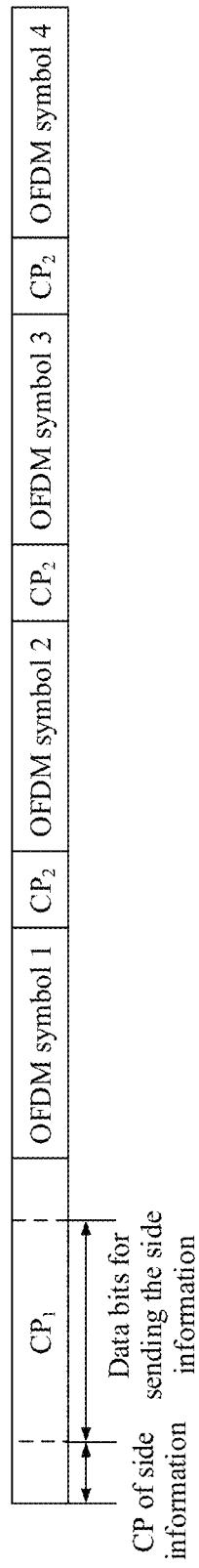
FIG. 8 is a schematic diagram of transmission of side information on a first-type CP according to an embodiment of this application.

A value of Q may be determined based on a size of data of the side information obtained in step 5. When the side information obtained in step 5 is sent on the first-type CP in front of the OFDM symbol, some resources (the first resource in the first CP resources) of the first-type CP in front of the OFDM symbol may be used to send data that is partially duplicate with the side information. That is, when the side information is sent on the first-type CP in front of the OFDM symbol, the side information may have a CP. FIG. 8 is a schematic diagram of transmission of side information on a first-type CP according to an embodiment of this application. FIG. 8 shows only four OFDM symbols as an example, and side information is sent on a first-type CP (denoted as $CP_1$) in front of the first OFDM symbol. However, during actual application, a quantity of OFDM symbols is not limited, and first-type CPs in front of specific OFDM symbols that are used to send the side information is not limited either.

For ease of understanding, the first-type CP in front of the OFDM symbol in step 7 may be represented by a vector $A_1$. Assuming that the first-type CP in front of the OFDM symbol includes l data bits, $A_1=[a_0, a_1, \ldots, a_{Q-1} a_Q, \ldots, a_{l-1}]$. That all the Q data bits in the first-type CP are set to zero may be represented as: elements of Q data bits $a_0, a_1, \ldots,$ and $a_{Q-1}$ are 0, and elements of l–Q data bits $a_Q, \ldots,$ and $a_{l-1}$ are not 0, that is, $A_1=[0, 0, \ldots, 0, a_Q, \ldots, a_{l-1}]$.

Step 8: Map the side information (the baseband constellation mapping signal) obtained in step 5 to the Q data bits reserved in the first-type CP in step 7.

For ease of understanding, the side information may also be represented by using a vector B. Assuming that the size of the data of the side information is Q data bits, $B=[b_0, b_1, \ldots, b_{Q-1}]$. The side information obtained in step 5 is mapped to the Q data bits reserved in the first-type CP in step 7, to obtain $A_2=[b_0, b_1, \ldots, b_{Q-1}, 0, \ldots, 0]$. $A_2$ includes l data bits, Q data bits in $A_2$ are side information, and elements of the remaining l–Q data bits are 0.

Step 9: Add the OFDM symbol, to which the first-type CP is added, obtained in step 7 and a result obtained in step 8, and transmit an obtained result after a subsequent signal processing procedure such as digital-to-analog conversion (D/A), up-conversion, or power amplification.

After the OFDM symbol is generated in step 6, no processing is performed on the data carried on the OFDM symbol in step 7 and step 8, but only the first-type CP in front of the OFDM symbol is processed. Therefore, a change of the OFDM symbol is not discussed herein, and only a change of the first-type CP in front of the OFDM symbol is discussed. Therefore, in step 9, the change of the first-type CP is expressed by using the vector A as: $A=A_1+A_2=[b_0, b_1, \ldots, b_{Q-1}, a_Q, \ldots a_{l-1}]$. In step 9, the OFDM symbol, to which the first-type CP is added, obtained in step 7 and the result obtained in step 8 are added, to obtain the OFDM symbol that carries the data and the first-type CP. The data carried on the first-type CP is shown in the foregoing A.

Figure 9:
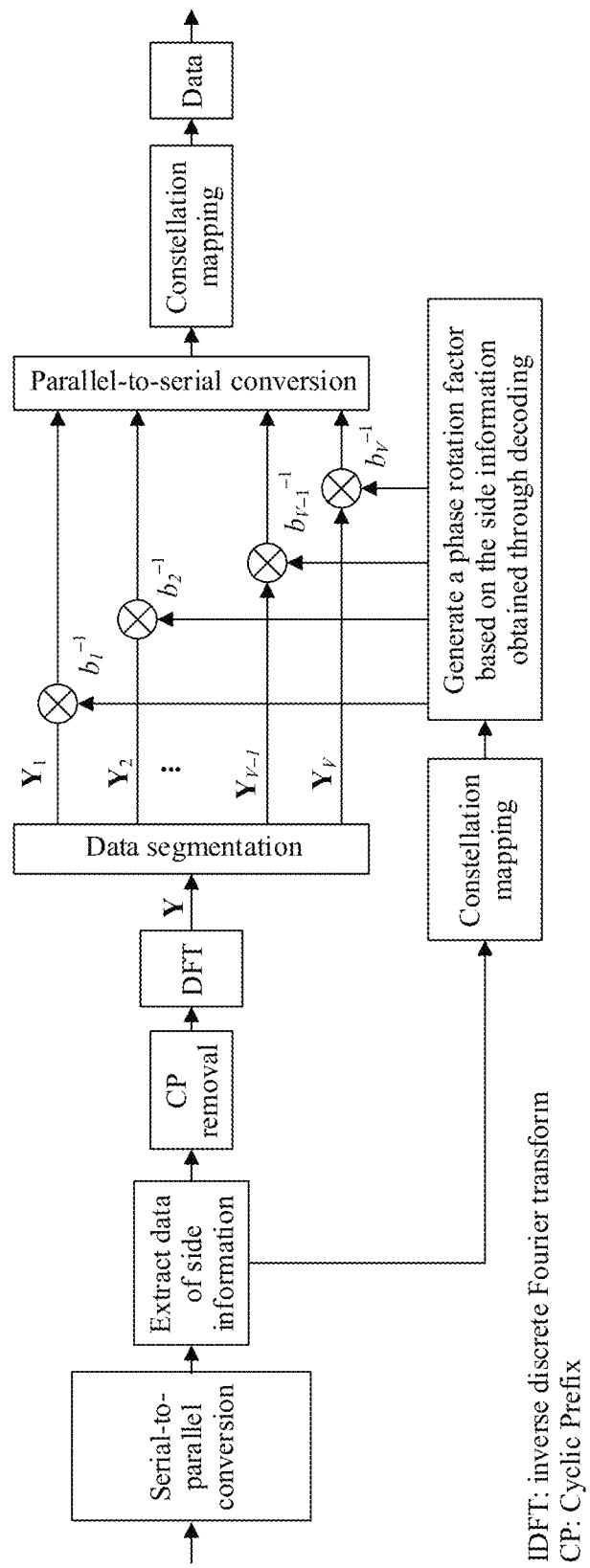
FIG. 9 is a schematic diagram of obtaining data by a receive end according to an embodiment of this application.

In another optional specific embodiment, FIG. 9 is a schematic diagram of obtaining data by a receive end according to an embodiment of this application. A process in which the receive end obtains the data is briefly described below with reference to FIG. 9. Optionally, a process in which the receive end obtains the data on the OFDM symbol may be inverse to the process in which the transmit end generates the OFDM symbol.

Step 10: Perform processing such as down-conversion, analog-to-digital conversion (A/D), and serial-to-parallel conversion on the received signal.

Step 11: Extract the data of the side information based on the Q data bits reserved in the first-type CP for the side information in step 7.

Step 12: Perform constellation demapping on the extracted data of the side information to obtain the side information, and further obtain the phase rotation factor used by the transmit end.

Step 13: Perform CP removal on the OFDM data obtained in step 10 (that is, remove the first-type CP in front of the OFDM symbol), and then perform discrete Fourier transform (DFT) to obtain data Y.

Step 14: Perform data segmentation on the data Y obtained in step 13. Y is divided into V data sub-blocks, to obtain data sub-blocks $Y_1, Y_2, \ldots,$ and $Y_V$. Each sub-block has P/V pieces of data. For example, $Y_1=[y_0, y_1, \ldots, y_{P/V-1}]$, and $Y_2=[y_{P/V}, y_{P/V+1}, \ldots, y_{2P/V-1}]$.

Step 15: Perform, based on the phase rotation factor obtained in step 12, inverse phase rotation on the data sub-block obtained in step 14.

Step 16: Perform constellation demapping (channel decoding, and the like, which are omitted herein) on a result obtained in step 15 after parallel-to-serial conversion, to finally obtain decoded user data.

In this embodiment of this application, the data of the side information is sent on some resources (the first CP resource) of the first-type CP, to ensure spectral efficiency of a system.

The communication method in the embodiments of this application is described in detail above. To better implement the foregoing solutions in the embodiments of this application, the embodiments of this application further provide a corresponding apparatus and/or device.

Figure 10:
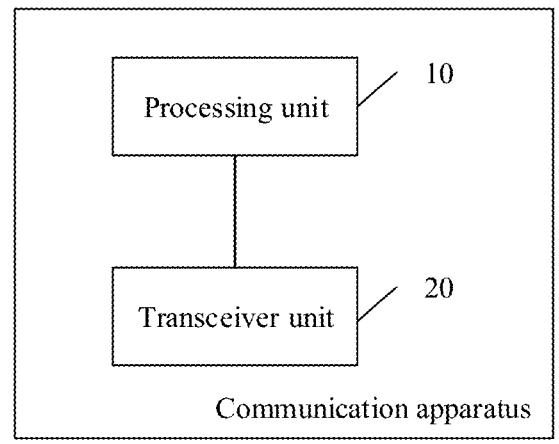
FIG. 10 is a schematic diagram of a structure of a communication apparatus according to an embodiment of this application.

FIG. 10 is a schematic diagram of a structure of a communication apparatus according to an embodiment of this application. As shown in FIG. 10, the communication apparatus may include:

a processing unit 10, configured to generate a first signal; and a transceiver unit 20, configured to send the first signal generated by the processing unit 10. The first signal includes an OFDM symbol, a first-type CP, and a second-type CP. CP resources of the first-type CP may include a first CP resource and a second CP resource. CP resources of the second-type CP may include the second CP resource. The first CP resource is used to carry data that is different from data carried on the OFDM symbol. The second CP resource is used to carry data that is the same as the data carried on the OFDM symbol.

In some feasible implementations, a length of the first-type CP is greater than a first length, a length of the second-type CP is less than the first length, and a sum of lengths of M first-type CPs and K—M second-type CPs that belong to a same slot, a same subframe, or a same frame in the first signal is a product of the first length and K (that is, a total length of CPs in a slot, a subframe, or a frame remains unchanged).

In some feasible implementations, the data carried on the first CP resource includes side information.

In some feasible implementations, a resource size of the first CP resource is determined based on a size of data of the side information.

In some feasible implementations, the length of the second-type CP is greater than or equal to a multipath delay spread of a channel.

In some feasible implementations, the first CP resource includes a first resource and a second resource, the first resource may be used to carry data that is the same as/duplicate with the side information, and the second resource may be used to carry the side information.

In some feasible implementations, the transceiver unit 20 is further configured to send a CP indication message, where the CP indication message is used to indicate the first CP resource.

During specific implementation, for implementation of each unit, refer to corresponding descriptions of the transmit end in the method embodiment shown in FIG. 2, and the method and the function performed by the transmit end in the foregoing embodiment are performed.

In this embodiment of this application, the communication apparatus generates the first signal and sends the first signal. The first signal includes the OFDM symbol, the first-type CP, and the second-type CP. The CP resources of the first-type CP include two types of CP resources: the first CP resource and the second CP resource. The CP resources of the second-type CP include one type of CP resource, that is, the second CP resource. The first CP resource may be used to carry the data that is different from the data carried on the OFDM symbol (that is, the data carried on the first CP resource and the data carried on the OFDM symbol are not duplicate, indicating that the first CP resource carries valid data). The second CP resource may be used to carry the data that is the same as the data carried on the OFDM symbol (that is, the data carried on the second CP resource is duplicate with the data carried on the OFDM symbol, indicating that the second CP resource carries invalid data). In this embodiment of this application, the valid data is sent on the first CP resource of the first-type CP, so that utilization of the CP resources can be improved, and a waste of the CP resources can be reduced, thereby improving transmission efficiency of an NTN communication system.

Figure 11:
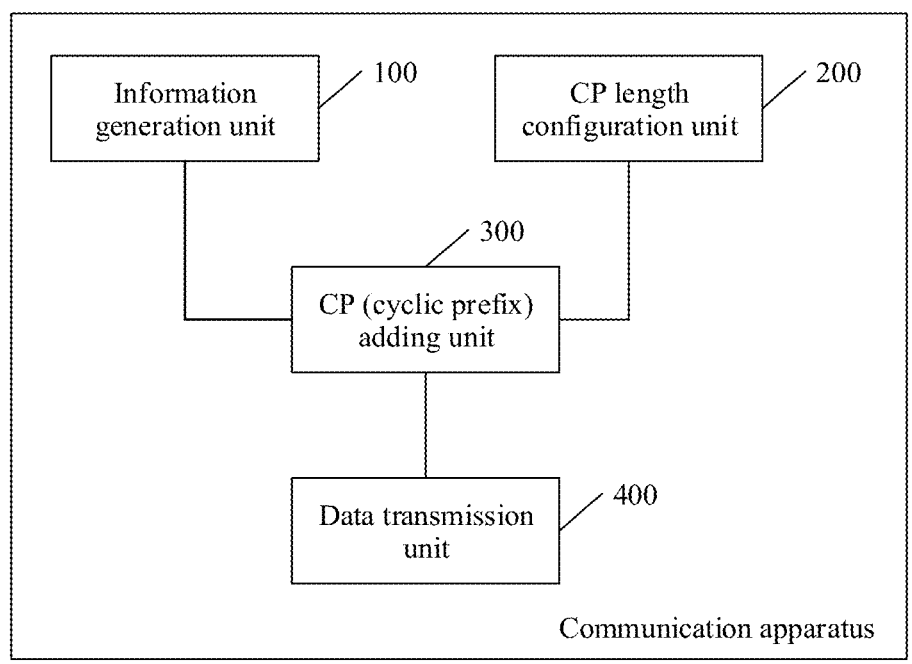
FIG. 11 is another schematic diagram of a structure of a communication apparatus according to an embodiment of this application.

FIG. 11 is another schematic diagram of a structure of a communication apparatus according to an embodiment of this application. As shown in FIG. 11, the communication apparatus may include:

an information generation unit 100, configured to generate an information symbol such as an OFDM symbol; a CP length configuration unit 200, configured to shorten lengths of CPs in front of K—M OFDM symbols to obtain K—M second-type CPs, and extend lengths of CPs in front of M OFDM symbols to obtain M first-type CPs; a CP adding unit 300, configured to allocate the CP configured by the CP length configuration unit 200 to the information symbol generated by the information generation unit 100, to form a time sequence symbol to be sent; and a data transmission unit 400, configured to send data by using some CP resources of the first-type CPs in front of the M OFDM symbols.

The information generation unit 100, the CP length configuration unit 200, the CP adding unit 300, and the data transmission unit 400 may be one unit, for example, a processing unit.

During specific implementation, for implementation of each unit, refer to corresponding descriptions of the transmit end in the method embodiment shown in FIG. 2, and the method and the function performed by the transmit end in the foregoing embodiment are performed.

In this embodiment of this application, CP lengths/resources are integrated, and valid data is sent on the integrated first-type CP, so that a waste of the CP resources can be reduced, and utilization of the CP resources can be improved, thereby improving transmission efficiency of an NTN communication system.

Figure 12:
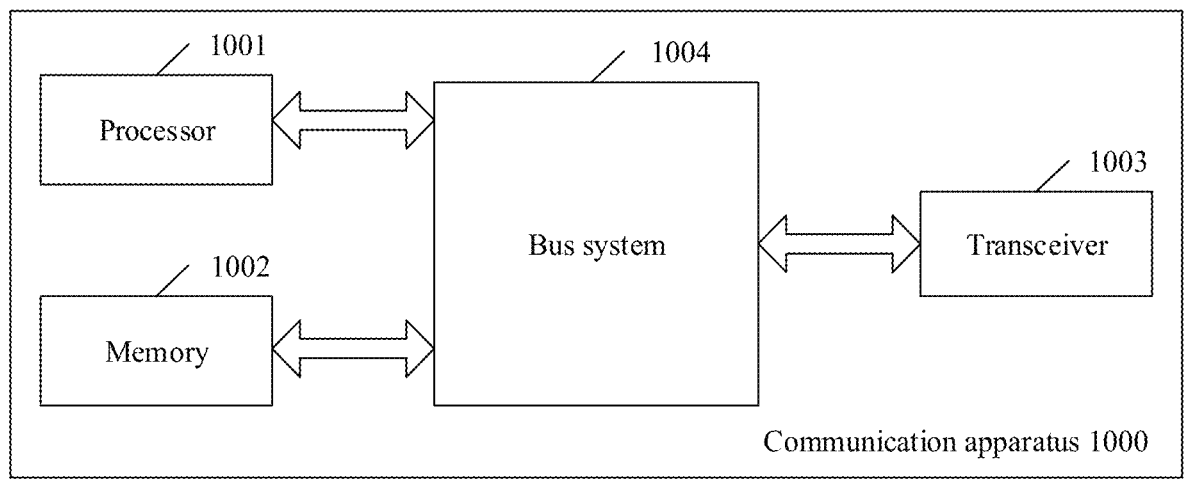
FIG. 12 is a schematic diagram of a structure of a communication device according to an embodiment of this application.

FIG. 12 is a schematic diagram of a structure of a communication device 1000 according to an embodiment of this application. As shown in FIG. 12, the communication device 1000 provided in this embodiment of this application includes a processor 1001, a memory 1002, a transceiver 1003, and a bus system 1004. The communication device provided in this embodiment of this application may be any one of a terminal device and a network device.

The processor 1001, the memory 1002, and the transceiver 1003 are connected by using the bus system 1004.

The memory 1002 is configured to store a program. Specifically, the program may include program code, and the program code includes computer operation instructions. The memory 1002 includes but is not limited to a random access memory (RAM), a read-only memory (ROM), an erasable programmable read-only memory (EPROM), or a compact disc read-only memory (CD-ROM). Only one memory is shown in FIG. 12, and certainly, a plurality of memories may alternatively be set as required. The memory 1002 may alternatively be a memory in the processor 1001. This is not limited herein.

The memory 1002 stores the following elements, executable units or data structures, or subsets or extended sets thereof:

an operation instruction that includes various operation instructions and is used to implement various operations; and an operating system that includes various system programs and is used to implement various basic services and process a hardware-based task.

The processor 1001 controls an operation of the communication device 1000. The processor 1001 may be one or more central processing units (CPUs). When the processor 1001 is one CPU, the CPU may be a single-core CPU, or may be a multi-core CPU.

During specific application, various components of the communication device 1000 are coupled together by using the bus system 1004. In addition to a data bus, the bus system 1004 may further include a power bus, a control bus, a status signal bus, and the like. However, for ease of clear description, all buses in FIG. 12 are denoted as the bus system 1004. For ease of illustration, FIG. 12 shows merely a schematic drawing.

FIG. 2 provided in the embodiments of this application or the method of the transmit end disclosed in the foregoing embodiments, or FIG. 2 provided in the embodiments of this application or the method of the receive end in the foregoing embodiments may be applied to the processor 1001, or implemented by the processor 1001. The processor 1001 may be an integrated circuit chip, and has a signal processing capability. In an implementation process, the steps in the foregoing methods can be implemented by using a hardware integrated logic circuit in the processor 1001, or by using instructions in a form of software. The foregoing processor 1001 may be a general purpose processor, a digital signal processor (DSP), an application-specific integrated circuit (ASIC), a field programmable gate array (FPGA) or another programmable logic device, a discrete gate or a transistor logic device, or a discrete hardware component. The processor may implement or perform the methods, the steps, and logical block diagrams that are disclosed in the embodiments of this application. The general purpose processor may be a microprocessor, or the processor may be any conventional processor, or the like. Steps of the methods disclosed with reference to the embodiments of this application may be directly performed and completed by a hardware decoding processor, or may be performed and completed by using a combination of hardware and software modules in the decoding processor. The software module may be located in a mature storage medium in the art, for example, a random access memory, a flash memory, a read-only memory, a programmable read-only memory, an electrically erasable programmable memory, or a register. The storage medium is located in the memory 1002. The processor 1001 reads information in the memory 1002, and performs, in combination with hardware of the processor 1001, the method steps of the transmit end described in FIG. 2 or the foregoing embodiments, or performs, in combination with hardware of the processor 1001, the method steps of the receive end described in FIG. 2 or the foregoing embodiments.

An embodiment of this application further provides a computer program product. The computer program product includes computer program code. When the computer program code is run on a computer, the computer is enabled to perform the method steps of the transmit end described in FIG. 2. Alternatively, when the computer program code is run on a computer, the computer is enabled to perform the method steps of the receive end described in FIG. 2.

An embodiment of this application further provides a chip, including a processor. The processor is configured to read and execute a computer program stored in a memory, to perform the communication method in any possible implementation of FIG. 2. Optionally, the chip further includes the memory, and the memory is connected to the processor by using a circuit or a wire. Further, optionally, the chip further includes a communication interface, and the processor is connected to the communication interface. The communication interface is configured to receive data and/or information that need/needs to be processed. The processor obtains the data and/or the information from the communication interface, processes the data and/or the information, and outputs a processing result through the communication interface. The communication interface may be an input/output interface.

Optionally, the processor and the memory may be physically independent units, or the memory may be integrated with the processor.

A person of ordinary skill in the art may understand and implement all or some of the processes of the methods in the embodiments, and the procedure may be completed by a computer program instructing relevant hardware. The program may be stored in a computer-readable storage medium. When the program is executed, the processes of the methods in the embodiments may be performed. The foregoing storage medium includes any medium that can store program code, such as a ROM, a random access memory (RAM), a magnetic disk, or an optical disk.

What is claimed is:

1. A communication method, comprising:
   generating a first signal, wherein the first signal comprises an orthogonal frequency division multiplexing (OFDM) symbol, a first-type cyclic prefix (CP), and a second-type CP, and wherein:
   CP resources of the first-type CP comprise a first CP resource and a second CP resource,
   CP resources of the second-type CP comprise the second CP resource,
   the first CP resource is used to carry data that is different from data carried on the OFDM symbol, and
   the second CP resource is used to carry data that is the same as the data carried on the OFDM symbol; and
   sending the first signal.

2. The communication method according to claim 1, wherein:
   a length of the first-type CP is greater than a first length,
   a length of the second-type CP is less than the first length, and
   a sum of lengths of M first-type CPs and K—M second-type CPs that belong to a same slot in the first signal is a product of the first length and K.

3. The communication method according to claim 1, wherein the data carried on the first CP resource comprises side information.

4. The communication method according to claim 3, wherein:
   the first CP resource comprises a first resource and a second resource,
   the first resource is used to carry data that is the same as the side information, and
   the second resource is used to carry the side information.

5. The communication method according to claim 3, wherein a resource size of the first CP resource is determined based on a size of data of the side information.

6. The communication method according to claim 1, wherein a length of the second-type CP is greater than or equal to a multipath delay spread of a channel.

7. The communication method according to claim 1, wherein the communication method further comprises:
   sending a CP indication message, wherein the CP indication message is used to indicate the first CP resource.

8. A communication apparatus, comprising:
   at least one processor; and
   at least one non-transitory memory coupled to the at least one processor and storing computer program instructions for execution by the at least one processor to:
   generate a first signal, wherein the first signal comprises an orthogonal frequency division multiplexing (OFDM) symbol, a first-type cyclic prefix (CP), and a second-type CP, and wherein:
   CP resources of the first-type CP comprise a first CP resource and a second CP resource,
   CP resources of the second-type CP comprise the second CP resource,
   the first CP resource is used to carry data that is different from data carried on the OFDM symbol, and
   the second CP resource is used to carry data that is the same as data carried on the OFDM symbol; and
   send the first signal.

9. The communication apparatus according to claim 8, wherein:
   a length of the first-type CP is greater than a first length,
   a length of the second-type CP is less than the first length, and
   a sum of lengths of M first-type CPs and K—M second-type CPs that belong to a same slot in the first signal is a product of the first length and K.

10. The communication apparatus according to claim 8, wherein the data carried on the first CP resource comprises side information.

11. The communication apparatus according to claim 10, wherein:
    the first CP resource comprises a first resource and a second resource,
    the first resource is used to carry data that is the same as the side information, and
    the second resource is used to carry the side information.

12. The communication apparatus according to claim 10, wherein a resource size of the first CP resource is determined based on a size of data of the side information.

13. The communication apparatus according to claim 8, wherein a length of the second-type CP is greater than or equal to a multipath delay spread of a channel.

14. The communication apparatus according to claim 8, wherein the communication apparatus is a chip.

15. A non-transitory computer-readable storage medium, wherein the non-transitory computer-readable storage medium stores computer program instructions for execution by at least one processor to:
    generate a first signal, wherein the first signal comprises an orthogonal frequency division multiplexing (OFDM) symbol, a first-type cyclic prefix (CP), and a second-type CP, and wherein:
    CP resources of the first-type CP comprise a first CP resource and a second CP resource, CP resources of the second-type CP comprise the second CP resource, the first CP resource is used to carry data that is different from data carried on the OFDM symbol, and the second CP resource is used to carry data that is the same as data carried on the OFDM symbol; and send the first signal.

16. The non-transitory computer-readable storage medium according to claim 15, wherein:

a length of the first-type CP is greater than a first length, a length of the second-type CP is less than the first length, and a sum of lengths of M first-type CPs and K—M second-type CPs that belong to a same slot in the first signal is a product of the first length and K.

17. The non-transitory computer-readable storage medium according to claim 15, wherein the data carried on the first CP resource comprises side information.

18. The non-transitory computer-readable storage medium according to claim 17, wherein:

the first CP resource comprises a first resource and a second resource, the first resource is used to carry data that is the same as the side information, and the second resource is used to carry the side information.

19. The non-transitory computer-readable storage medium according to claim 17, wherein a resource size of the first CP resource is determined based on a size of data of the side information.

20. The non-transitory computer-readable storage medium according to claim 15, wherein a length of the second-type CP is greater than or equal to a multipath delay spread of a channel.

* * * * *